Figure 1A:
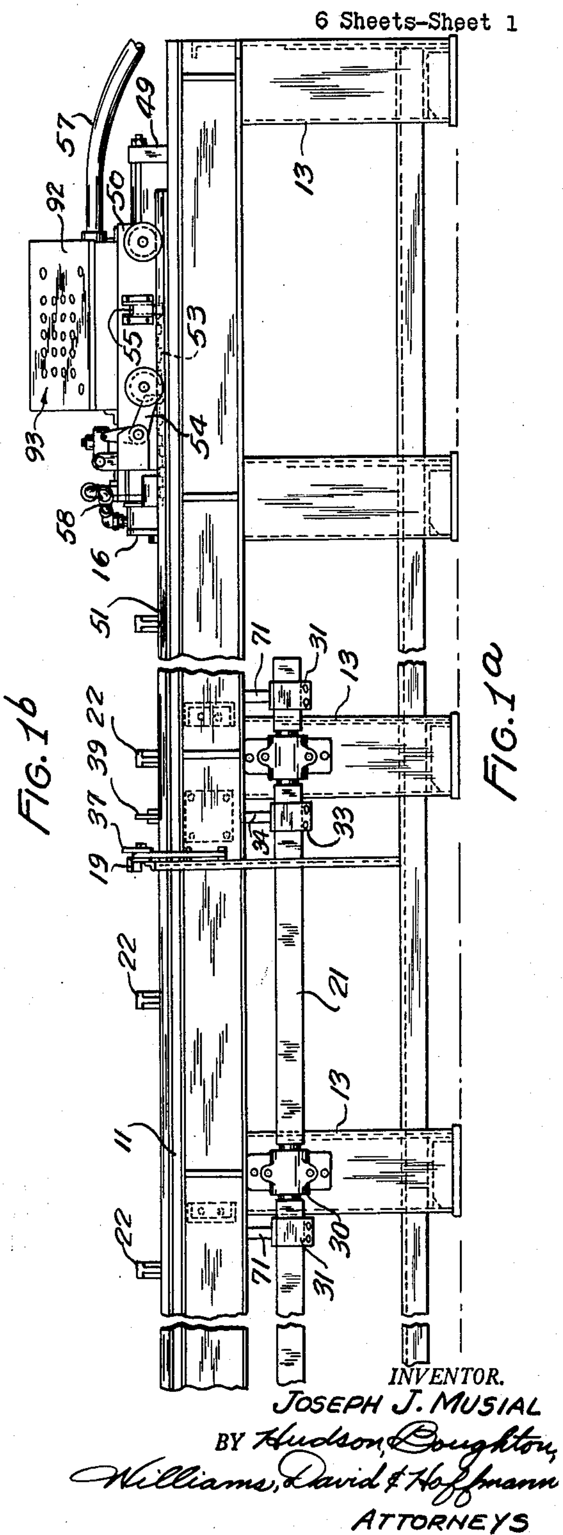

May 30, 1961 J. J. MUSIAL 2,986,029

PIPE TESTING MACHINE

Filed June 9, 1959 6 Sheets-Sheet 1

INVENTOR.
JOSEPH J. MUSIAL
BY Hudson, Boughton, Williams, David & Hoffmann
ATTORNEYS May 30, 1961 J. J. MUSIAL 2,986,029

PIPE TESTING MACHINE

Filed June 9, 1959 6 Sheets-Sheet 2

INVENTOR.
JOSEPH J. MUSIAL
BY Hudson, Boughton, Williams, David & Hoffmann
ATTORNEYS

PIPE TESTING MACHINE

Filed June 9, 1959 6 Sheets-Sheet 3

INVENTOR.
JOSEPH J. MUSIAL
BY Hudson, Boughton,
Williams, David & Hoffmann
ATTORNEYS May 30, 1961 J. J. MUSIAL 2,986,029

PIPE TESTING MACHINE

Filed June 9, 1959 6 Sheets-Sheet 4

INVENTOR.
JOSEPH J. MUSIAL
BY Hudson, Boughton,
Williams, David & Hoffmann
ATTORNEYS May 30, 1961 J. J. MUSIAL 2,986,029

PIPE TESTING MACHINE

Filed June 9, 1959 6 Sheets-Sheet 5

INVENTOR.

JOSEPH J. MUSIAL

BY Hudson, Boughton, Williams, David & Hoffmann

ATTORNEYS

May 30, 1961 J. J. MUSIAL 2,986,029

PIPE TESTING MACHINE

Filed June 9, 1959

6 Sheets-Sheet 6

INVENTOR.
JOSEPH J. MUSIAL
BY Hudson, Boughton, Williams, David & Hoffmann
ATTORNEYS

United States Patent Office 2,986,029

Patented May 30, 1961

1

2,986,029

PIPE TESTING MACHINE

Joseph J. Musial, Youngstown, Ohio, assignor to The Youngstown Welding & Engineering Company, Youngstown, Ohio, a corporation of Ohio Filed June 9, 1959, Ser. No. 819,059

5 Claims. (Cl. 73—49.1)

This invention relates to tube or pipe testing machines and more particularly to apparatus for testing lengths of tube or pipe for weakness or leaks and/or uniformity of length, and sorting or separating them into groups according to quality and/or length.

One of the principal objects of the invention is the provision of a tube or pipe testing apparatus having feed means for delivering lengths of tube or pipe individually from a supply or loading rack to a test position where they are supported and clamped in alignment with longitudinally extendable heads adapted to sealingly engage the ends thereof, and means for introducing hydraulic fluid such as water under pressure into the tube or pipe in test position to test for leaks, weak spots, or other defects, in combination with means for ejecting the tested article and sorting them into good and defective groups, etc.

Another object of the invention is the provision of a novel and effective testing machine of the character referred to which is reliable and positive in operation and capable of subjecting a large number of tubes or pipes to hydraulic pressure and measurement of length in rapid succession, and which apparatus is adjustable to accommodate tube and pipe of differing diameters and lengths, and in which the functions of feeding, testing, ejecting and sorting may be controlled either automatically in sequence or by manual push-button control.

Another object of the invention is the provision of a novel and improved testing machine of the character referred to comprising a frame on which are mounted a set of longitudinally aligned and extendable heads or chucks for engaging the open ends of a tube or pipe, feed means including vertically reciprocable lifting members adapted to raise lengths of tube or pipe one at a time over stop means holding back a supply of such articles on an inclined loading rack, the lifting members being linked for reciprocation to a rock-shaft rotatably supported on the frame, and ejecting means adapted to lift the tested pipes from the test position onto an inclined conveyor for transfer by gravity to a gating means for diveting the good and defective pipes, etc. into different receptacles, the ejecting means being also linked to the mentioned rock-shaft for reciprocation simultaneously with that of the feed means.

Still another object of this invention is the provision of a tube or pipe testing apparatus of the above mentioned character which is simple yet rugged in construction, positive and reliable in operation, and which requires a minimum of maintenance and supervision in use, the functions and operations of which are effected by fluid pressure motor means such as air and/or hydraulic cylinders or the like which may be conveniently actuated through solenoid operated valve means controlled by a system of limit switches in circuitry well understood by those versed in the art to which the invention pertains.

The invention may be described as residing in certain constructions and arrangements of parts, and further objects and advantages thereof will be apparent to those skilled in the art to which it relates from the following detailed description of a presently preferred embodiment described with reference to the accompanying sheets of drawings forming a part of this specification, and in which:

2

Figure 1B:
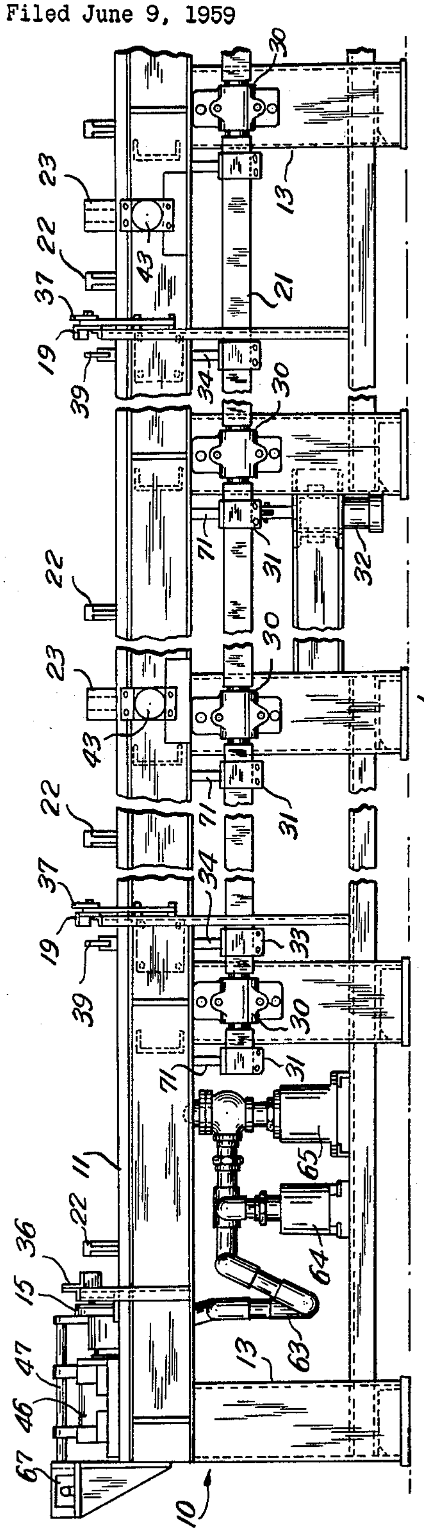
Figure 2A:
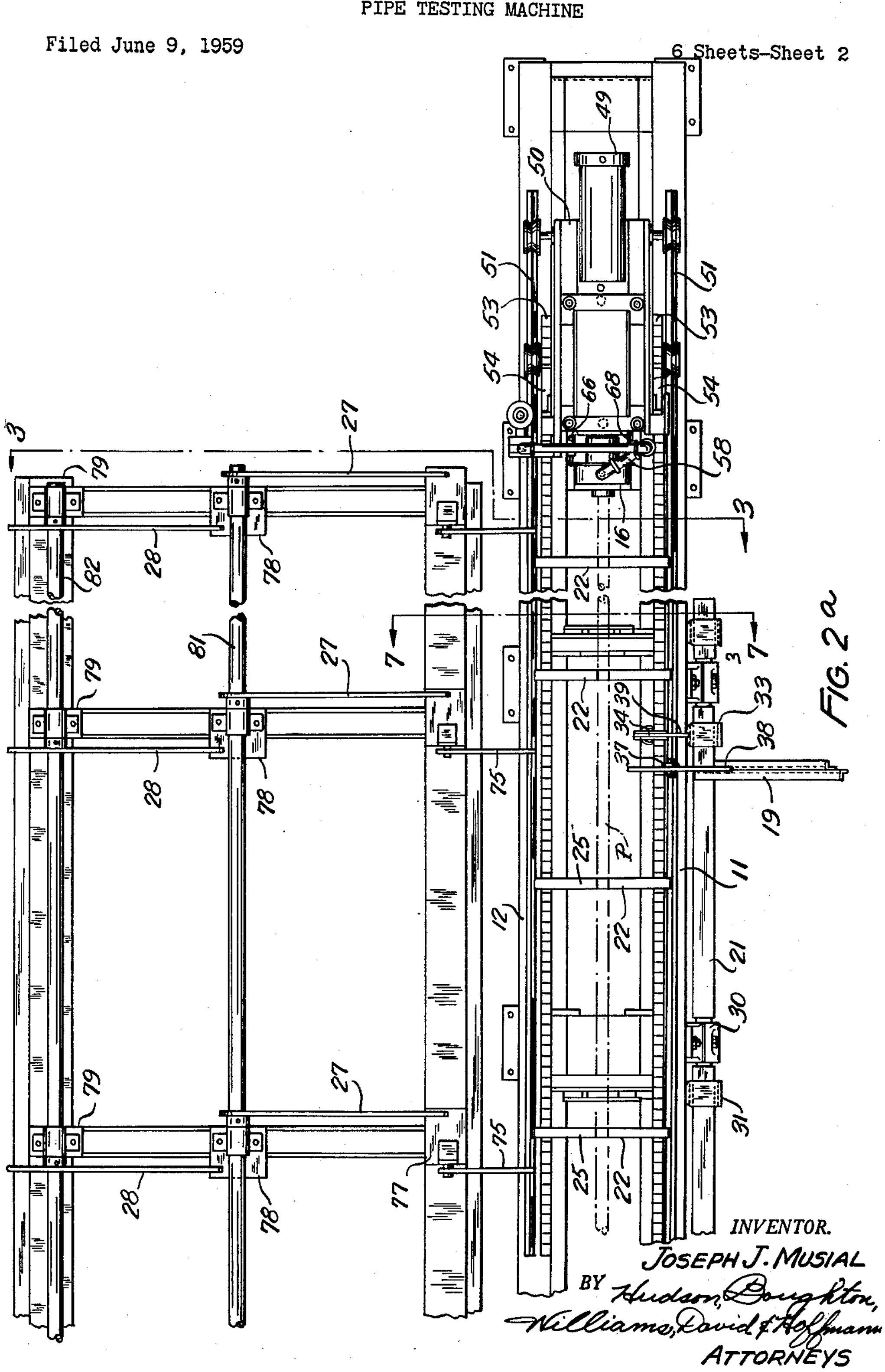
Figure 2B:
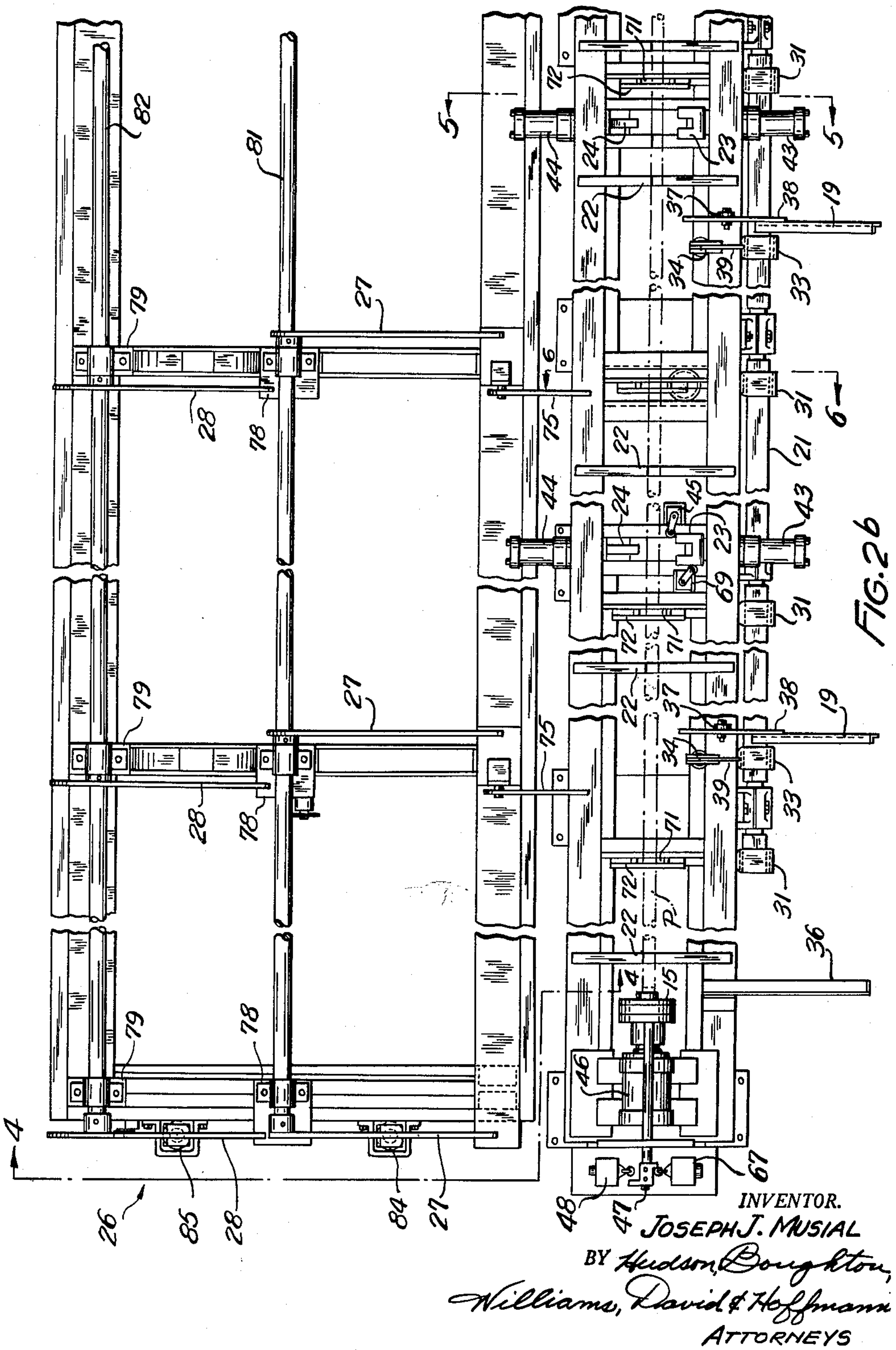
Figure 3:
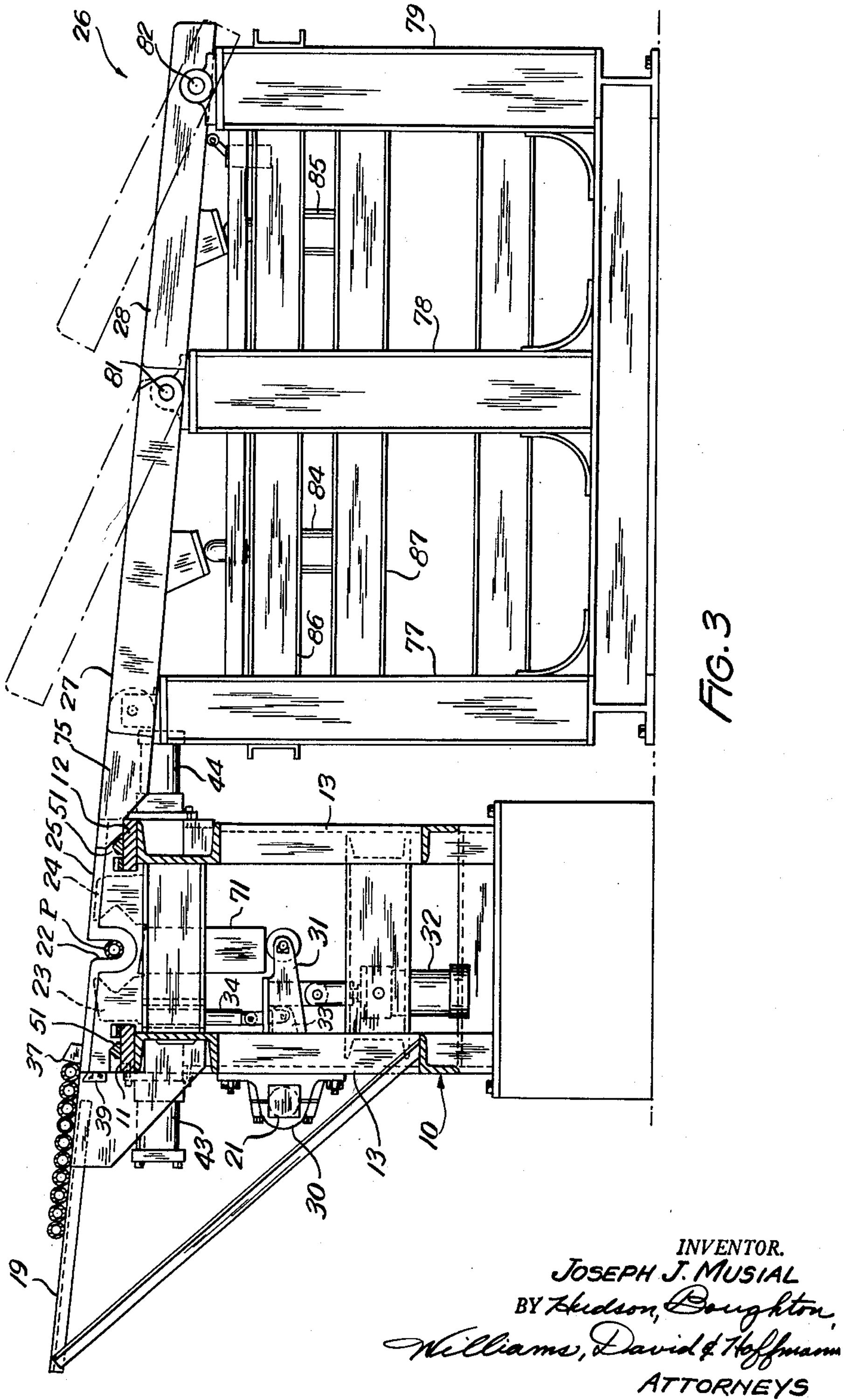
Figure 4:
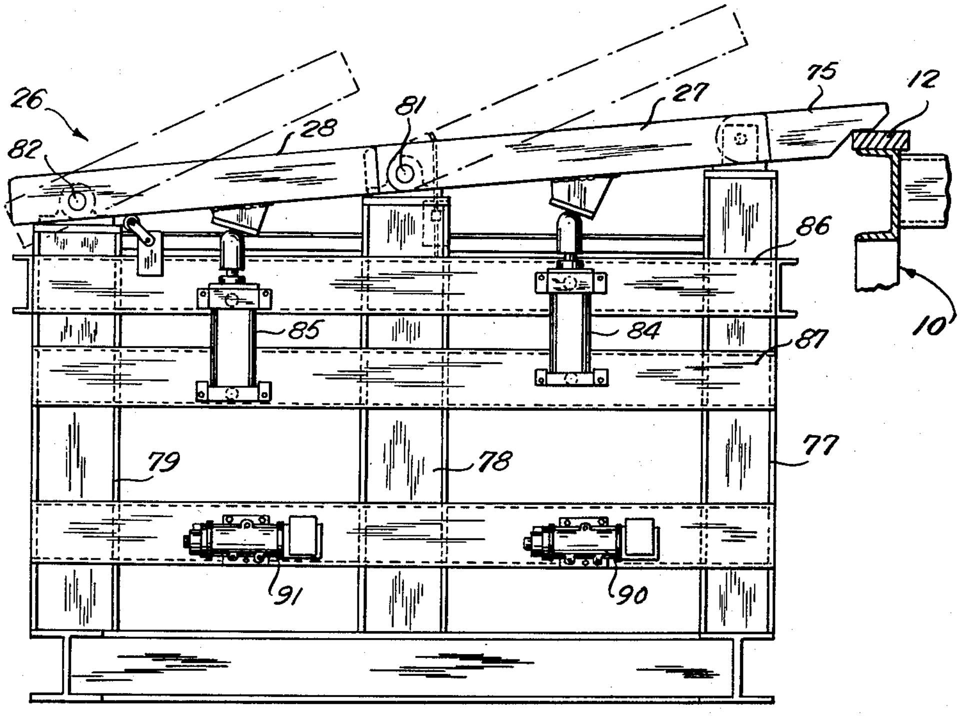
Figure 5:
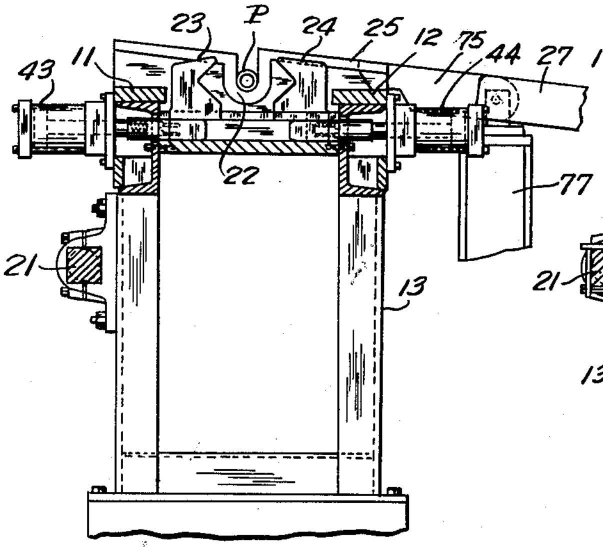
Figure 6:
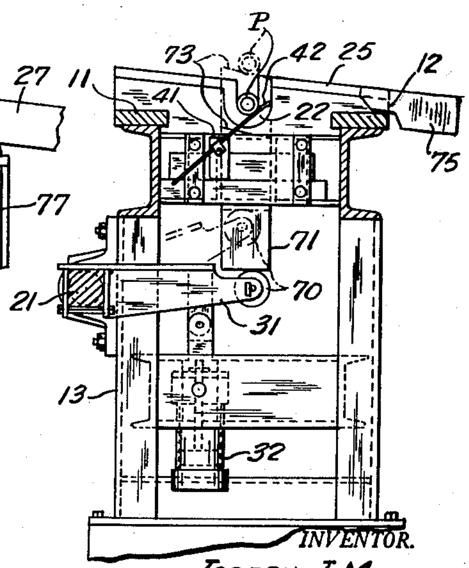
Figure 7:
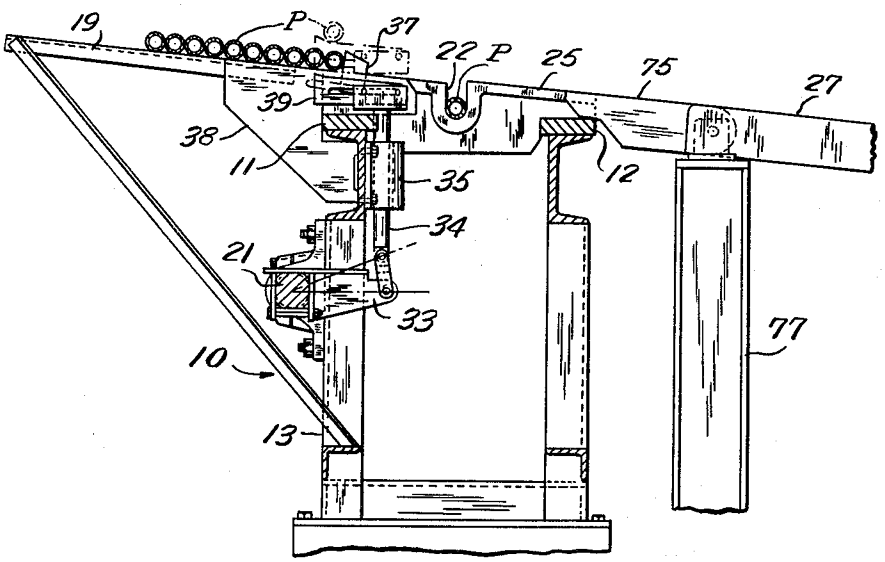

Figs. 1*a* and 1*b* show a side elevation of a tube or pipe testing machine embodying this invention, Figs. 2*a* and 2*b* show a top plan view of the testing machine of Figs. 1*a* and 1*b*, Fig. 3 is a sectional view of the testing machine taken along line 3—3 of Fig. 2*a*, Fig. 4 is an end view of the gate means of the testing machine taken along line 4—4 of Fig. 2*b*, Fig. 5 is a sectional view of the tube or pipe clamping means with the jaws thereof in open position and taken along line 5—5 of Fig. 2*b*, Fig. 6 is a sectional view of the tube or pipe ejecting mechanism of the machine taken along line 6—6 of Fig. 2*b*, and Fig. 7 is a sectional view taken along line 7—7 of Fig. 2*a* and illustrating the tube or pipe feeding or escapement mechanism.

Referring to the drawings, the preferred form of apparatus embodying this invention for testing tubes or pipes, etc., hereinafter collectively referred to as pipe or pipes, under hydraulic pressure and sorting out defective lengths, etc., includes a frame indicated generally at 10 and having longitudinal upper members 11 and 12 on the top sides of longitudinal extending channels supported by upright members or legs 13. A set of longitudinally movable heads or chucks 15 and 16 are supported adjacent to opposite ends of the frame 10 between the members 11 and 12 and are adapted to sealingly engage opposite ends of a length of pipe to be tested.

A number of lengths of pipe P are supported adjacent to the side of the member 11 by a loading rack in the form of a number of inclined arms 19 from which the pipes P are permitted to roll one at a time, by an escapement or feed means operated from a rock-shaft 21, into a plurality of aligned grooves in supports or cradles 22 for testing. When resting in the cradles 22 a pipe P is clamped in alignment with the extendable heads or chucks 15 and 16 by pairs of transversely movable jaws 23, 24. The chucks 15 and 16 are brought into sealing engagement with the ends of the pipe P in the test position and hydraulic fluid, such as water is introduced into the pipe under pressure to effect a test for leaks or weaknesses in the pipe. Upon completion of a timed pressure cycle, during which hammer means may be employed to loosen scale in the bore or interior of the pipe, and while in the test position the pipe is subjected to a relatively large flow of hydraulic fluid to flush any loose scale, etc. present out of the interior of the pipe. With the hydraulic pressure fluid cut off, the extendable heads or chucks 15 and 16 are retracted and the pipe ejected from the cradles 22 and permitted to roll down inclined surfaces 25 of the cradles to a gate or sorting means indicated generally at 26 and having sets of swingable gate arms 27 and 28 which are adapted to open to selectively receive the tested pipes in separate compartments accordingly to quality, length, etc.

The escapment or feed mechanism by which the pipes P are released or transferred individually from the loading rack or arms 19 to the cradles 22 for testing is operated from the rock-shaft 21 which is rotatably supported by bearing blocks 30 located on the legs 13 supporting the longitudinal member 11. The rock-shaft 21 is common to the feed means and to the ejection means for removing the tested pipes from the cradles 22, and is adapted to be momentarily rotated or rocked by an arm 31 connected to a fluid pressure preferably air, actuated motor or cylinder 32 which is responsive to limit switch and relay means later discussed in reference to the actuation of the ejection means.

As is best shown in Fig. 7, the shaft 21 has associated with it an arm 33 linked to a reciprocable plunger or rod 34 slidably secured to the frame 10 by a guide member 35. Pipes P stored on the inclined arms 19 are aligned at their ends by an angle member 36 and are stopped or held from rolling by positive stops or dogs 37 which are adjustably positioned on supports 38 of the arms 19. A lifting or feeding member 39 is carried by the plunger 34 and is adjustably arranged to engage a single pipe and lift it into the dotted line position of Fig. 7 permitting the pipe to roll past the stops 37 by gravity into the cradles 22 for testing.

The pipe P upon entering the aligned grooves in the cradles 22 closes a normally open limit switch 41 by striking the arm 42 thereof located at the bottom of a groove in one of the cradles 22, as is illustrated in Fig. 6. The closing of switch 41 energizes a conventional solenoid operated valve to admit fluid pressure, preferably air, into the fluid pressure motors or cylinders 43 and 44 in the required manner to move the clamp jaws 23, 24 into their pipe gripping position.

The inward transverse motion of one of the pipe clamp jaws 24 closes a limit switch 45 admitting fluid pressure, preferably oil, to a fluid motor or cylinder 46 to extend the head or chuck 15 into sealing engagement with an end of the pipe P in test position and which is to be tested. When the head 15 extends it carries with it a limit switch operating rod 47 which engages and closes a limit switch 48. Actuation of the limit switch 48 by the rod 47 produces actuation of a fluid motor or cylinder 49 to extend the head or chuck 16 into sealing engagement with the other end of the pipe to be tested.

The fluid motor or cylinder 49 is preferably in the form of a tandem air and hydraulic cylinder which may be selectively operated as an air motor alone or as a combined air and hydraulic motor. The former is used for the testing of smaller diameter pipe of the order, for example, of ½ inch to 1 inch, where the use of air only in cylinder 49 provides enough force to withstand the hydraulic water pressure to which the pipe being tested is subjected. The cylinder 49 is operated as a combined air and hydraulic motor when testing larger sizes of pipe, for example 1¼ inches to 4 inches in diameter, and when so operated both air and hydraulic fluid, preferably oil, under pressure are admitted into their respective chambers of the tandem cylinder 49 to provide enough force to withstand the hydraulic test water pressure.

Whether the operation of the cylinder 49, in response to the closing of limit switch 48, is by air, or air and hydraulic fluid depends upon the position of a selector switch. An electric solenoid actuated two way hydraulic valve is connected in series in the hydraulic supply line in advance of a similarly operated four way hydraulic valve. This two way valve is either open or shut depending upon the setting of the aforesaid selecting switch and the type of operation desired. The four way hydraulic valve and a four way air valve for controlling the flow of air to and from the air chamber of the motor 49 are electrically connected to operate in parallel. The four way hydraulic valve has an external pilot pressure source which allows the valve spool to shift even though the oil supply thereto has been shut off by the two way hydraulic valve being closed for air operation only. The aforementioned shifting of the four way hydraulic valve allows any residual oil in the oil section or chamber of the tandem cylinder 49 to be returned to the hydraulic fluid reservoir, when operating on air only.

As previously mentioned the longitudinally extendable heads or chucks 15 and 16 are mounted at opposite end portions of the frame 10 between the members 11 and 12 thereof, and the head 15 has its actuating or extending cylinder 46 fixedly mounted to the frame 10, while the head 16 has its actuating cylinder 49 supported by a wheeled carriage 50 adjustably positioned along rails or ways 51 surmounting the frame members 11 and 12. A series of ratchet teeth 53 is provided adjacent each way 51 and is adapted to be engaged by a pawl 54 and a locking slide bolt 55 for preventing movement of the carriage 50 and the head 16 away from the head 15 during operation of the machine but permitting the carriage and head 16 to be adjusted towards or from the head 15 to accommodate differing lengths of pipe.

The carriage 50 has conduit means for conducting test water or other hydraulic fluid from the head 16. This conduit means includes a member 57 leading from the carriage 50 to a flexible connection, not shown, and a jointed or articulated pipe connection 58 extends from the head 16 to the carriage 50. Normally closed valve means within the carriage is provided to control the flow of hydraulic test fluid from the head 16.

Hydraulic test fluid is supplied to the extendable head 15 from a high pressure source such as an accumulator through a pipe 63 and under the control of a high pressure control valve means located at 64. Low pressure hydraulic fluid for prefilling the pipe to be tested may be supplied to the pipe 63 through a check valve under the control of a low pressure control valve means located at 65.

The closing of switch 48 to extend the head 16 also starts a suitable commercially available motor driven timer switch which after a slight delay during which the head 16 seals over the end of the pipe to be tested, actuates the valves 64 and 65 to turn the hydraulic test fluid on and subject the pipe to the pressure exerted thereby. In the event a pipe to be tested is too short to permit the extendable head 16 to make sealing engagement therewith, a normally closed limit switch 66 or the carriage 50 will be engaged and opened by the over extending motion of the head 16. The switch 66 is in series with the motor driven timer switch and its opening prevents actuation of the valves 64 and 65, thereby preventing the spillage of test fluid. After another slight time delay, during which any leaks or other defects in the pipe become apparent assuming the pipe is of suitable length and fluid pressure has been applied thereto, and during which interval the pipe may be hammered to loosen scale therein, the normally closed purge valve located in the carriage 50 and leading from the head 16 to the sump is opened and the test fluid admitted through the head 15 flushes out any loose scale from the pipe. After a further time delay, the hydraulic test fluid is shut off and both extendable heads 15 and 16 are retracted engaging limit switches 67 and 68, respectively. The limit switches 67 and 68 are effective to actuate the clamp operating cylinders 43 and 44 to retract or open the jaws 23 and 24 to free the tested pipe. The opening of one of the clamp jaws 24 engages and closes a limit switch 69 forming a part of a timed relay circuit to which a means for ejecting a tested pipe length from the cradles 22 is responsive.

The means by which the lengths of tested pipe are ejected from the test position which they occupy in the cradles 22 is best illustrated in Fig. 6. The fluid pressure motor or cylinder 32 is linked to the arm 31 associated with the rock-shaft 21 which serves to reciprocate the previously described feeding mechanism and which is responsive to the limit switch 69 and relay means for momentarily actuating the motor 32 and the ejection means. The arm 31 has a roller 70 thereon in engagement with the bottom face of a vertically extending slide or ejecting member 71, and the ejecting member will be reciprocated thereby upon the momentary actuation of the motor or cylinder 32.

There are a plurality of ejecting members 71 illustrated in this embodiment each being vertically reciprocable in guideways 72 located between the cradles 22 spaced longitudinally along the frame 10. The upper end of each ejection member 71 is inclined as at 73 so that when the members 71 are lifted to the dotted line position seen in Fig. 6, the pipe P, lifted thereby out of the cradles 22, will roll under the influence of gravity onto the inclined surfaces 25 leading to the gate or sorting means 26.

Inasmuch as the ejection means just described and the feeding mechanism are both operated from the common rock-shaft 21, a subsequent pipe to be tested will be transferred to the cradles 22 at the same time that a tested pipe is being ejected therefrom.

The gate or sorting means 26 is located adjacent the member 12 of the frame 10 and has a plurality of bridging arms 75 resting on the member 12 and providing an extension to the inclined surfaces 25. The gate means comprises sets of uprights 77, 78 and 79 spaced apart and of decreasing height going away from the frame 10, and surmounted by longitudinally extending shaft means 81 and 82 rotatably journalled on the uprights 78 and 79.

A set of inclined gate arms 27 is secured to the shaft 81 for common lifting action to the dotted line position of Fig. 4, and a similar set of gate arms 28 is secured to the shaft 82 for similar common lifting action. Fluid pressure motors or actuating cylinders 84 and 85, preferably air, are secured to cross-members 86, 87 and in operative relation with the sets of gate arms 27 and 28 respectively, and are adapted to raise and lower the gate arms to either divert or pass tested lengths of pipe rolling down the inclined surfaces 25 from the cradles 22. The cylinders or motors 84 and 85 are actuated under the control of solenoid operated valves 90 and 91 which are connected thereto for reciprocation thereof in a well known manner, the valves being responsive to switch means on the control panel 60.

It will be observed that the illustrated gate means 26 offers the selection of three different groups of categories, that is, one with gate arms 27 open, another with gate arms 28 open, and a third with both sets of arms 27 and 28 closed allowing pipe to roll completely beyond. Thus the sorting arrangement is flexible and can be operated in a variety of ways, for example by allowing defective pipes to fall below gates 27 and good pipes to fall below the gates 28 or, as another example, good pipes can be permitted to pass both sets of gates with the gates 27 being used for sorting out leaky pipes and the gates 28 being used to sort out pipes of irregular length. The particular sorting pattern is not material to the invention, however the particular relation and arrangement of parts by which the feeding, testing, ejecting, and assorting are accomplished in material thereto.

Atop the carriage 50 is conveniently located a control panel 92 having an array of push-buttons or switches 93 for controlling the various machine functions individually or for selecting automatic control.

Although the invention has been described in considerable detail with reference to a specific embodiment thereof it will be appreciated that fluid pressure motors or cylinders used therein may be either air or hydraulic, and that detecting means for sensing the presence of leaks by responding to changes in hydraulic pressure during the pipe testing period, switch means for detecting irregular lengths, and the like may be employed therein to initiate the reject function.

There has been disclosed in the foregoing description and accompanying drawings a pipe testing machine embodying the present invention which readily accomplishes the previously mentioned objects and advantages, as well as others, and it is understood that the apparatus is susceptible to certain changes in practice and that the invention includes all those changes and modifications reasonably embraced by the scope of the following claims.

Having thus described my invention, I claim:

1. In a machine for hydrostatically testing lengths of pipe, a frame, first and second chuck means adapted to sealingly engage opposite ends of a length of pipe positioned therebetween and having openings therethrough for the admission and discharge of hydraulic fluid to and from a length of pipe engaged thereby, cradle means for supporting a length of pipe between and in alignment with said chuck means, rack means for supporting a plurality of lengths of pipe to be tested adjacent to said cradle means, feed means for transferring lengths of pipe from said rack means to said cradle means, a first reciprocating-type fluid pressure actuated motor having relatively movable piston and cylinder elements, means connecting one of said relatively movable elements of said first fluid pressure actuated motor to said frame for reciprocation of the other of said elements of said first fluid pressure actuated motor lengthwise of a length of pipe supported by said cradle means, means connecting one of said chuck means to said other of said relatively movable elements of said first fluid pressure actuated motor, carriage means connected to said frame for movement lengthwise of a length of pipe supported in said cradle means, a second reciprocating-type fluid pressure actuated motor having relatively movable piston and cylinder elements, means connecting one of said relatively movable elements of said second fluid pressure actuated motor to said carriage means for reciprocation of the other of said elements of said second fluid pressure actuated motor lengthwise of a length of pipe supported in said cradle means, means connecting the other of said chuck means to said other of said relatively movable elements of said second fluid pressure actuated motor, means for securing said carriage means in different positions to which it may be moved in said frame, first valve means for controlling the admission of hydraulic fluid under pressure through one of said chuck means into a length of pipe in said cradle means, second valve means for controlling the discharge of hydraulic fluid from a length of pipe in said cradle means through the other of said chuck means, means for ejecting a length of pipe from said cradle means, and sorting conveyor means adjacent to the side of said cradle means opposite to said rack means for receiving an ejected length of pipe, said sorting conveyor means having a plurality of selectively operable gates.

2. In a machine for hydrostatically testing a length of pipe as claimed in claim 1 comprising means initiated by a length of pipe being received in said cradle means for automatically controlling in the following sequence actuation of one of the reciprocating-type fluid pressure actuated motors to move one of the chuck means toward the other chuck means, actuation of the other reciprocating-type fluid pressure actuated motor to move the other chuck means towards the first mentioned chuck means, actuation of the first valve means to permit hydraulic fluid under pressure to flow through one of the chuck means into the interior of a length of pipe in the cradle means for a predetermined period, actuation of the second valve means to permit discharge of hydraulic fluid from the other end of such length of pipe through the other of the chuck means for a period overlapping the admission of hydraulic fluid thereto through the first mentioned chuck means, actuation of the reciprocating-type fluid pressure actuated motors to move the chuck means in directions away from one another, and actuation of the feed and ejecting means.

3. In a machine for hydrostatically testing a length of pipe as claimed in claim 2 comprising means responsive to overtravel of the second moved chuck means for stopping the cycle of operation.

4. In a machine for hydrostatically testing lengths of pipe, a frame, first and second chuck means adapted to sealingly engage opposite ends of a length of pipe positioned therebetween and having openings therethrough for the admission and discharge of hydraulic fluid to and from a length of pipe engaged thereby, cradle means for supporting a length of pipe between and in alignment with said chuck means, said cradle means comprising clamp means for engaging a length of pipe in said cradle means intermediate its ends, rack means for supporting a plurality of lengths of pipe to be tested adjacent to said cradle means, feed means for transferring lengths of pipe from said rack to said cradle means, a first reciprocating-type fluid pressure actuated motor having relatively movable piston and cylinder elements, means connecting one of said relatively movable elements of said first fluid pressure actuated motor to said frame for reciprocation of the other of said elements of said first fluid pressure actuated motor lengthwise of a length of pipe supported by said cradle means, means connecting one of said chuck means to said other of said relatively movable elements of said first fluid pressure actuated motor, carriage means connected to said frame for movement lengthwise of a length of pipe supported in said cradle means, a second reciprocating-type fluid pressure actuated motor having relatively movable piston and cylinder elements, means connecting one of said relatively movable elements of said second fluid pressure actuated motor to said carriage means for reciprocation of the other of said elements of said second fluid pressure actuated motor lengthwise of a length of pipe supported in said cradle means, means connecting the other of said chuck means to said other of said relatively movable elements of said second fluid pressure actuated motor, means for securing said carriage means in different positions to which it may be moved in said frame, first valve means for controlling the admission of hydraulic fluid under pressure through one of said chuck means into a length of pipe in said cradle means, second valve means for controlling the discharge of hydraulic fluid from a length of pipe in said cradle means through the other of said chuck means, means for ejecting a length of pipe from said cradle means, and sorting conveyor means adjacent to the side of said cradle means opposite to said rack means for receiving an ejected length of pipe, said sorting conveyor means having a plurality of selectively operable gates.

5. In a machine for hydrostatically testing a length of pipe as claimed in claim 4 comprising means responsive to a length of pipe being received in said cradle means for controlling actuation of the clamp means to clamping position, means responsive to movement of said clamp means towards clamping position for controlling actuation of the first of the reciprocating-type fluid pressure actuated motor to move the chuck means associated therewith towards the other chuck means, means responsive to movement of the chuck means associated with said first of the reciprocating-type fluid pressure actuated motors towards the other chuck means for controlling actuation of the second of the reciprocating-type fluid pressure actuated motors to move the second of the chuck means towards the first chuck means and the initiation of timer control which after predetermined progressively longer periods causes actuation of the first valve means to permit hydraulic fluid under pressure to flow through one of the chuck means into the interior of a length of pipe in the cradle means for a predetermined period and actuation of the second valve means to permit discharge of hydraulic fluid from the other end of such length of pipe through the other of the chuck means for a period overlapping the admission of hydraulic fluid thereto through the first chuck means and actuation of the reciprocating-type fluid pressure actuated motors to move the chuck means in directions away from one another, means responsive to overtravel of the second moved chuck means towards the first moved chuck means for stopping said timer control, means responsive to movement of the chuck means in directions away from one another for controlling actuation of the clamp means towards unclamping position, and means responsive to movement of the clamp means towards unclamping position for controlling actuation of the feed and ejecting means.

References Cited in the file of this patent

UNITED STATES PATENTS

| | | |
|---|---|---|
| 1,971,065 | Dieter | Aug. 21, 1934 |
| 1,972,630 | Neale | Sept. 4, 1934 |
| 2,183,974 | Richardson | Dec. 19, 1939 |
| 2,551,645 | Stadelman | May 8, 1951 |